(12) United States Patent
Zhong et al.

(10) Patent No.: US 11,025,016 B2
(45) Date of Patent: Jun. 1, 2021

(54) ELECTRICAL ASSEMBLY TO PREVENT IMPROPER INSTALLATION

(71) Applicant: LEAR CORPORATION, Southfield, MI (US)

(72) Inventors: Yuanlong Zhong, Shanghai (CN); Shi Qing Qiu, Shanghai (CN); Shuo Tian, Shanghai (CN)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 16/722,411

(22) Filed: Dec. 20, 2019

(65) Prior Publication Data

US 2020/0203897 A1 Jun. 25, 2020

(51) Int. Cl.
| | | |
|---|---|---|
| H01R 13/68 | (2011.01) | |
| H01R 13/688 | (2011.01) | |
| H01R 13/506 | (2006.01) | |
| H01R 43/20 | (2006.01) | |
| H01R 13/426 | (2006.01) | |
| H01R 25/16 | (2006.01) | |
| H01R 13/64 | (2006.01) | |

(52) U.S. Cl.
CPC ......... *H01R 13/688* (2013.01); *H01R 13/426* (2013.01); *H01R 13/506* (2013.01); *H01R 13/64* (2013.01); *H01R 25/162* (2013.01); *H01R 43/20* (2013.01)

(58) Field of Classification Search
CPC .. H01R 13/688; H01R 13/426; H01R 13/506; H01R 13/64; H01R 25/162; H01R 43/20
USPC ................................... 439/620.27
See application file for complete search history.

(56) References Cited

U.S. PATENT DOCUMENTS

| | | | |
|---|---|---|---|
| 2,091,452 A | 8/1937 | Ramsey | |
| 4,153,326 A * | 5/1979 | Frantz ................. | H01R 13/28 439/293 |
| 4,255,004 A * | 3/1981 | Kourimsky ............ | H01R 31/02 439/65 |
| 5,088,940 A * | 2/1992 | Saito ................... | H01H 85/205 439/620.34 |
| 5,795,193 A * | 8/1998 | Yang ................... | H01R 9/2458 439/620.27 |
| 6,322,376 B1 * | 11/2001 | Jetton ................. | H01R 4/302 411/107 |
| 6,396,380 B1 * | 5/2002 | Girke .................. | H01H 85/044 337/189 |
| 6,570,088 B1 * | 5/2003 | Depp .................. | B60R 16/0238 174/50 |
| 6,780,026 B2 * | 8/2004 | Sato .................... | H01R 9/226 439/76.2 |

(Continued)

FOREIGN PATENT DOCUMENTS

KR 101671866 B1 11/2016

*Primary Examiner* — Abdullah A Riyami
*Assistant Examiner* — Vladimir Imas
(74) *Attorney, Agent, or Firm* — Brooks Kushman P.C.

(57) ABSTRACT

An electrical assembly is provided with a housing with an opening. An electrical terminal assembly is received within the housing. A cover is in cooperation with the housing to enclose the opening. An interference projection extends from a terminal position assurance assembly (TPA) or the cover and is in cooperation with the other of the TPA or the cover to prevent the cover from enclosing the opening of the housing when the electrical terminal assembly is improperly installed in the housing.

20 Claims, 4 Drawing Sheets

(56) References Cited

U.S. PATENT DOCUMENTS

| | | | | |
|---|---|---|---|---|
| 6,884,090 B2* | 4/2005 | Kubota | | H01R 9/2458 |
| | | | | 439/709 |
| 6,896,536 B1* | 5/2005 | Nguyen | | H01R 13/6272 |
| | | | | 439/299 |
| 6,922,331 B2* | 7/2005 | Ikeda | | H01R 9/226 |
| | | | | 361/624 |
| 7,283,366 B2* | 10/2007 | Yamashita | | B60R 16/0238 |
| | | | | 165/80.1 |
| 7,704,099 B1* | 4/2010 | Hong | | H01H 9/104 |
| | | | | 439/620.29 |
| 7,799,991 B1* | 9/2010 | Advey | | H01R 13/424 |
| | | | | 174/50 |
| 7,931,479 B1* | 4/2011 | De La Reza | | H05K 3/32 |
| | | | | 439/76.2 |
| 8,690,588 B2* | 4/2014 | Jetton | | B60R 16/0238 |
| | | | | 439/76.2 |
| 8,907,213 B2* | 12/2014 | I | | B60R 16/0238 |
| | | | | 174/50 |
| 9,356,378 B1* | 5/2016 | Glick | | H01R 43/20 |
| 9,462,702 B2 | 10/2016 | Darr et al. | | |
| 10,217,593 B2* | 2/2019 | Bougeard | | H01H 85/54 |
| 10,256,555 B2* | 4/2019 | Loew | | H02B 1/46 |
| 10,283,917 B1* | 5/2019 | Darr | | H01H 85/205 |
| 10,604,090 B1* | 3/2020 | Blumenstein | | B60R 16/03 |
| 2012/0199373 A1* | 8/2012 | Uchida | | B60R 16/0238 |
| | | | | 174/50 |
| 2013/0100716 A1* | 4/2013 | Tong | | H02M 5/458 |
| | | | | 363/37 |
| 2015/0009640 A1* | 1/2015 | Stern | | H01R 13/6658 |
| | | | | 361/752 |
| 2015/0311618 A1* | 10/2015 | Guillanton | | H01R 13/436 |
| | | | | 439/751 |
| 2016/0073520 A1* | 3/2016 | Darr | | H05K 7/026 |
| | | | | 361/752 |
| 2017/0179548 A1* | 6/2017 | Lee | | H01M 2/1077 |
| 2020/0036184 A1* | 1/2020 | Witkoe | | H02B 1/21 |
| 2020/0090894 A1* | 3/2020 | Gaitan | | H02G 3/086 |

\* cited by examiner

ELECTRICAL ASSEMBLY TO PREVENT IMPROPER INSTALLATION

TECHNICAL FIELD

This application claims foreign priority benefits under 35 U.S.C. § 119(a)-(d) to CN 201811593188.X, filed Dec. 25, 2018, the disclosure of which is hereby incorporated by reference in its entirety.

Various embodiments relate to electrical assemblies, such as power distribution electrical assemblies.

BACKGROUND

U.S. Pat. No. 9,462,702 B2 to Lear Corporation discloses a Power Distribution Box.

SUMMARY

According to at least one embodiment, an electrical assembly is provided with a housing with an opening. An electrical terminal assembly is received within the housing. A cover is in cooperation with the housing to enclose the opening. An interference projection extends from the electrical terminal assembly or the cover and is in cooperation with the other of the electrical terminal assembly or the cover to prevent the cover from enclosing the opening of the housing when the electrical terminal assembly is improperly installed in the housing.

According to a further embodiment, the electrical terminal assembly is provided with a terminal position assurance assembly (TPA) that is translatable relative to the housing between a first position to permit installation of terminals through the TPA and into the housing, and a second position to lock the terminals into the housing. A plurality of electrical terminals is installed through the TPA into the housing and locked into the housing by the TPA.

According to an even further embodiment, the TPA is provided with a substrate sized to be received in the housing. The interference projection extends from the substrate. A plurality of electrical terminals is installed in the substrate.

According to an even further embodiment, a busbar is in electrical communication with at least two of the plurality of electrical terminals.

According to an even further embodiment, a wire harness is in electrical communication with the busbar.

According to a further embodiment, an alignment projection extends from the electrical terminal assembly. The housing provides a sidewall with a slot formed therethrough adjacent the opening and sized to receive the alignment projection of the electrical terminal assembly.

According to an even further embodiment, a flange extends from the alignment projection outboard of the housing and the cover for manual alignment of the electrical terminal assembly relative to the housing.

According to another even further embodiment, the interference projection extends in a direction generally parallel with the at least one sidewall.

According to another even further embodiment, the interference projection extends from the cover between the at least one sidewall and the electrical terminal assembly when the electrical terminal assembly is properly installed in the housing.

According to another further embodiment, the housing includes a frame. At least one sidewall extends from the frame, partially defining the housing opening. The cover engages a distal peripheral edge of the at least one sidewall.

According to another even further embodiment, the interference projection extends from the electrical terminal assembly and engages the cover to prevent from the cover from engaging the distal peripheral edge of the at least one sidewall of the housing when the electrical terminal assembly is improperly installed in the housing.

According to another even further embodiment, the interference projection extends away from the frame.

According to another even further embodiment, the interference projection extends out of the housing opening.

According to another even further embodiment, the interference projection is further defined as a first interference projection. The electrical assembly is further provided with a second interference projection extending from the cover to engage the first interference projection when the electrical terminal assembly is improperly installed in the housing.

According to another even further embodiment, the second interference projection extends between the at least one sidewall and the first interference projection when the electrical terminal assembly is properly installed in the housing.

According to another further embodiment, a first fastener is provided on the at least one sidewall. A second fastener is provided on the cover to cooperate with the first fastener and secure the cover to the housing.

According to an even further embodiment, the interference projection prevents the second fastener from fastening to the first fastener when the electrical terminal assembly is improperly installed in the housing.

According to another further embodiment, a fuse array is installed into the housing in electrical communication with the electrical terminal assembly.

According to another further embodiment, the housing is provided with a frame, and a plurality of sidewalls extending from the frame thereby defining the opening.

According to an even further embodiment, the electrical terminal assembly is received within the housing and is installed upon the frame. The electrical assembly is further provided with a fuse array installed into the frame in electrical communication with the electrical terminal assembly.

According to another even further embodiment, the electrical terminal assembly is installed upon a first surface of the frame. The fuse array is installed upon a second surface of the frame that is spaced apart and opposed to the first surface.

According to yet another even further embodiment, a second cover cooperates with the housing frame to enclose the fuse array.

According to another embodiment, a method for assembling an electrical terminal assembly provides a housing, an electrical terminal assembly, and a terminal position assurance assembly (TPA). An interference component is provided on the electrical terminal assembly or the TPA to ensure proper installation. The electrical terminal assembly is installed in the housing. The TPA is pushed from a first position to a second position. If the TPA does not slide to the second position, the electrical terminal assembly is repositioned until the interference component is clear. The TPA is repushed to the second position on the housing.

According to another embodiment, a fuse housing assembly includes a housing with an opening. An electrical terminal assembly is received within the housing. A terminal position assurance assembly (TPA) is provided. A cover is in cooperation with the housing to enclose the opening. An interference projection extends from the TPA or the cover and is in cooperation with the other of the TPA or the cover to prevent the cover from enclosing the opening of the housing when the electrical terminal assembly is improperly installed in the housing. The interference between the cover and the TPA is caused by a failure of an installer to push the TPA from a first position to a second position during installation, or the TPA remains at the first position and cannot be pushed to the second position when the electrical terminal assembly is improperly installed in the housing, such that the electrical terminal assembly requires repositioning until the interference projection is cleared, and the cover encloses the opening.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

There are various electrical assemblies with multiple assembled components. Some of these electrical assemblies include power distribution assemblies and junction boxes, with examples including fuse boxes, relay boxes, power distribution centers (PDC), power distribution boxes (PDB), power network boxes (PNB), battery junction boxes (BJB), engine junction boxes (EJB), and the like.

Figure 1:
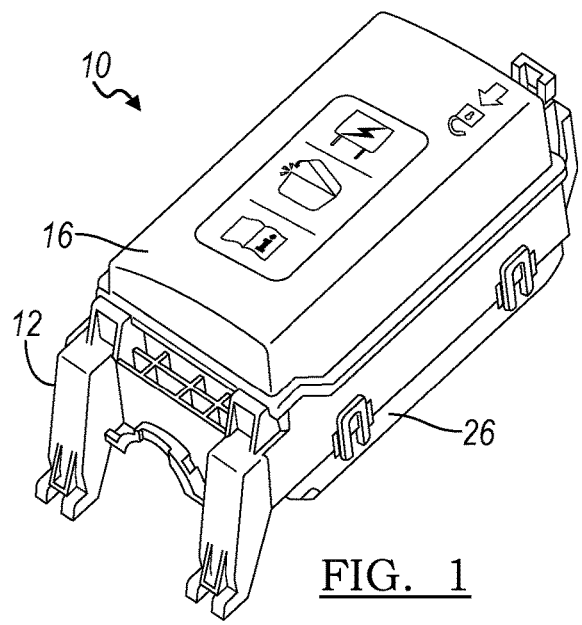
FIG. 1 is a top perspective view of an electrical assembly, according to an embodiment.
Figure 2:
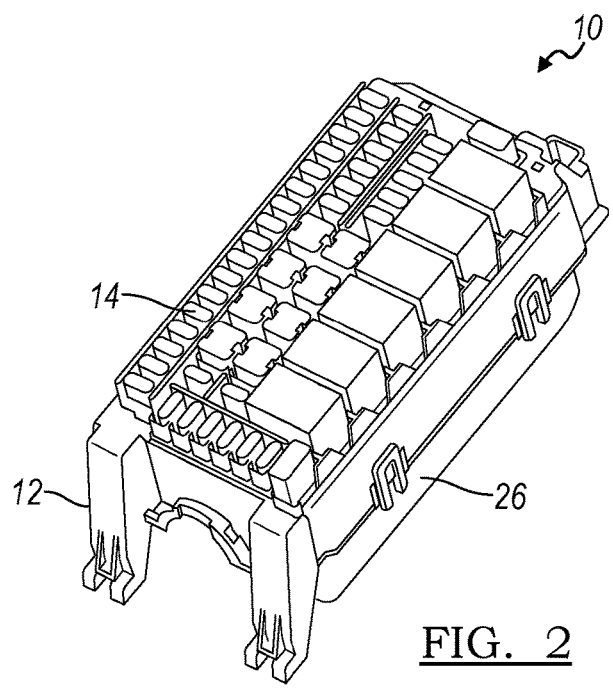
FIG. 2 is a top perspective view of the electrical assembly, illustrated partially disassembled.

FIGS. 1 and 2 illustrate one of these examples, according to an embodiment, as a power distribution center (PDC) 10 for an automotive vehicle. The PDC 10 can include either a printed circuit board (PCB) or a hard-wired electrical assembly which houses fuses, relays, diodes, and resistors. The PDC 10 is typically located in an engine compartment of the vehicle. The PDC 10 provides protection from compartment temperature and chemicals for fuses, relays, diodes, resistors, and any other component that is packaged inside the PDC.

Figure 3:
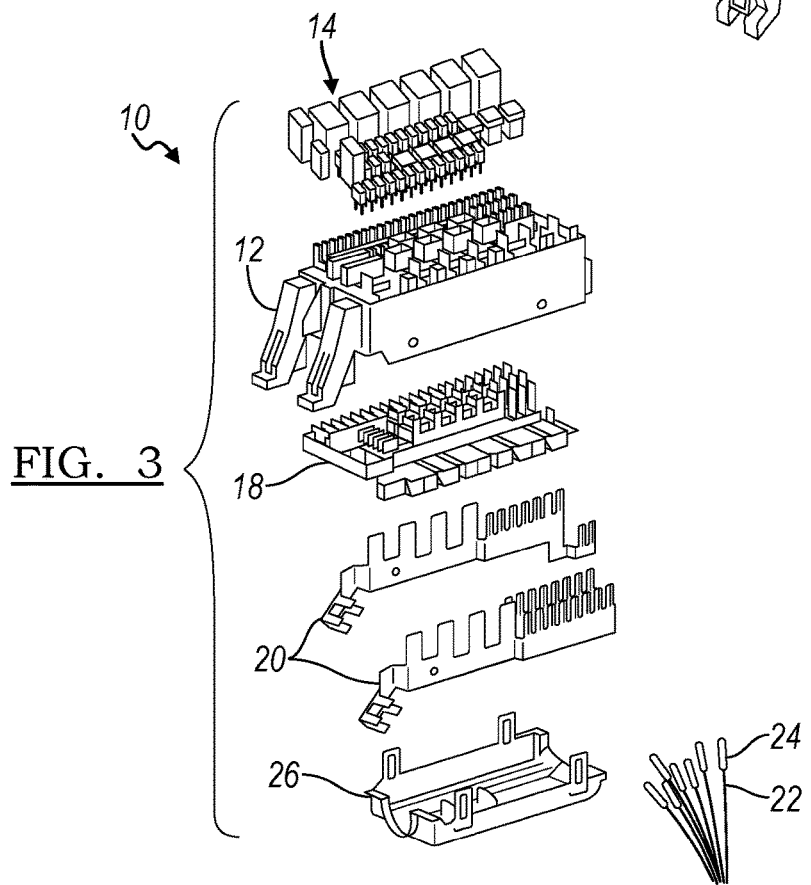
FIG. 3 is an exploded perspective view of the electrical assembly of FIG. 1.

Referring now to FIG. 3, the PDC 10 includes a housing with a frame 12. The frame 12 may be formed of a polymeric material and is adapted to be fastened to a vehicle body. The PDC 10 includes an array 14 of fuses and relays that are installed into a top region of the frame 12. The housing of the PDC 10 includes a top cover 16 (FIG. 1) for attaching to the frame 12 and enclosing the fuse/relay array 14 within the PDC 10. The top cover 16 protects the fuse/relay array 14 from an external environment, which may include dust, water or other contaminants.

The PDC 10 also includes a terminal position assurance substrate (TPA) 18 that is mounted in an underside of the frame 12. The TPA 18 provides a secondary lock for terminals and a conductive busbar 20. The TPA 18 can detect if terminals are seated at a proper position or not. A plurality of wires 22 are wired to terminals 24. Alternatively, a PCB may be connected to each of the terminals 24. The housing includes a bottom cover 26 that connects to the frame 12 to enclose the TPA 18, busbar 20, terminals 24, and wires 22 within the housing of the frame 12 and the bottom cover 26, and to protect these components from the external environment.

Figure 4:
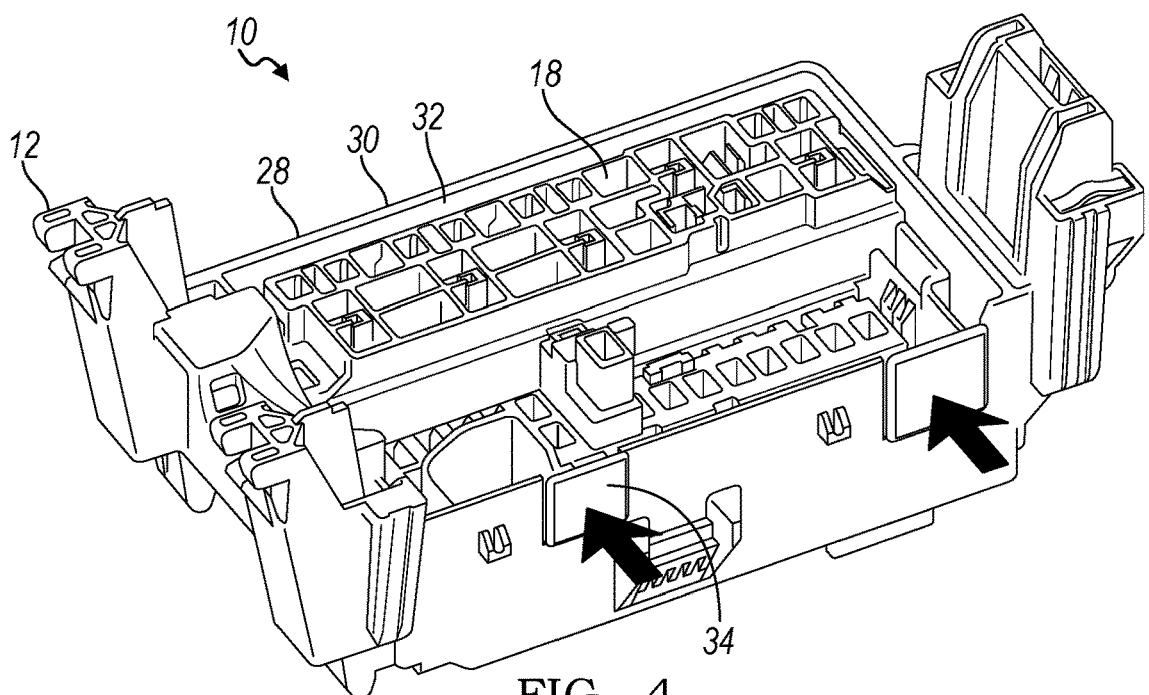
FIG. 4 is a bottom perspective view of the electrical assembly of FIG. 1, illustrated partially disassembled.

FIG. 4 illustrates the PDC 10 from the underside with the bottom cover 26 removed to illustrate the TPA 18 mounted within the frame 12. The frame 12 includes a peripheral sidewall 28 that extends downward and provides a cavity 30 with an opening 32 for receiving the TPA 18. The TPA 18 includes a plurality of flanges 34 that extend externally out of the cavity 30. The flanges 34 are provided for an installer to manually press the flanges 34 toward the sidewall 28, as illustrated by the arrows in FIG. 4. After the terminals 24 are installed into the frame 12 through the TPA 18, the operator presses the flanges 34, to translate the TPA 18 from a pre-position to an end position to detect whether the terminals 24 are seated at the proper position.

Figure 5:
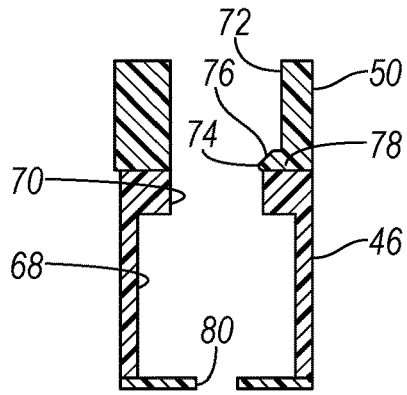
FIG. 5 is a side section view of a portion of the electrical assembly of FIG. 1, illustrated in an assembly pre-position of a terminal position assurance substrate (TPA)

FIG. 5 illustrates a section view of a portion of the PDC 10. Specifically, FIG. 5 illustrates a socket 46 of the frame 12 for receiving one of the terminals 24. The frame socket 46 includes a cavity 68 for receiving the terminal 24. The frame socket 46 includes an aperture 70 for receipt of the terminal 24 into the cavity 68. FIG. 5 also illustrates a socket 50 of the TPA 18 for receiving the terminal 24. The TPA socket 50 includes an aperture 72 aligned with the frame socket aperture 70 along an edge in the pre-position of FIG. 5.

Figure 6:
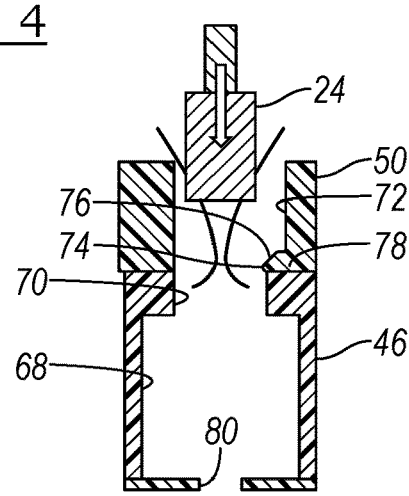
FIG. 6 is another side section view of the portion of the electrical assembly of FIG. 1, illustrated in the assembly pre-position of the TPA with an electrical terminal at an initial assembly position.
Figure 7:
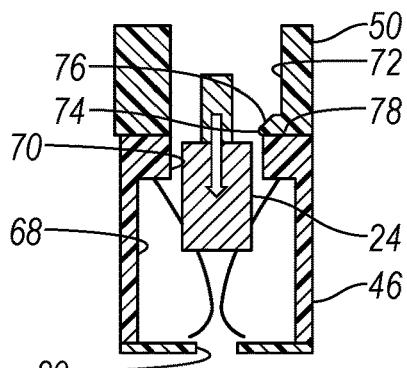
FIG. 7 is another side section view of the portion of the electrical assembly of FIG. 1, illustrated in the assembly pre-position of the TPA with an electrical terminal at a properly installed assembly position.
Figure 8:
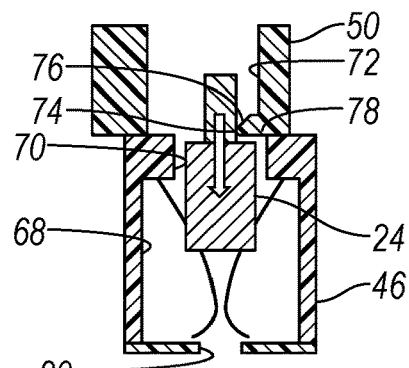
FIG. 8 is another side section view of the portion of the electrical assembly of FIG. 1, illustrated in a proper assembly end position of the TPA with the electrical terminal at the properly installed assembly position.

The TPA socket aperture 72 is oversized relative to the frame socket aperture 70. A projection 74 extends from the TPA socket 50 with a leading edge 76 toward the TPA socket 50 and an abutment edge 78 toward the frame socket aperture 70. Referring now to FIG. 6, the terminal 24 is installed into the TPA socket aperture 72, and then subsequently in FIG. 7, through the frame socket aperture 70 and into the frame socket cavity 68. In FIG. 8, the TPA 18 is moved from the pre-position to the end position as also illustrated in FIG. 4. In the end position of the TPA 18, the TPA socket projection is slid over the terminal 24 so that the abutment edge 78 retains the terminal 24 in the frame socket 46. An aperture 80 is formed in the frame 12 to receive a contact from one of the fuses/relays in the array 14.

Figure 9:
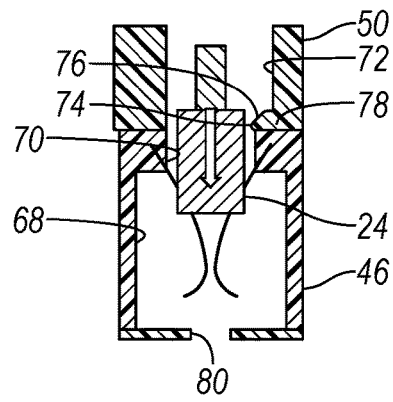
FIG. 9 is another side section view of the portion of the electrical assembly of FIG. 1, illustrated in the assembly pre-position of the TPA with an electrical terminal at an improperly installed assembly position.
Figure 10:
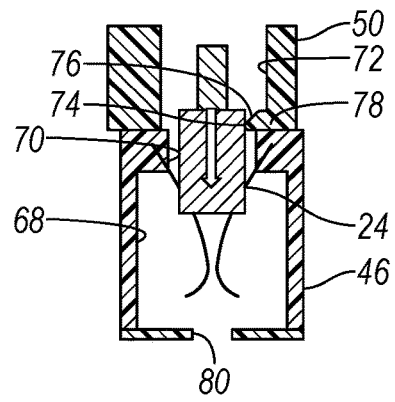
FIG. 10 is another side section view of the portion of the electrical assembly of FIG. 1, illustrated in an improper assembly end position of the TPA with the electrical terminal at the improperly installed assembly position.

During an improper installation of the terminal 24, the terminal 24 is installed into the TPA socket aperture 72 in FIG. 6, and then subsequently in FIG. 9, into the frame socket aperture 70 without fully seating within the frame socket cavity 68. In FIG. 10, the TPA 18 is moved from the pre-position toward the end position but cannot reach the end position due to an interference with the improperly installed terminal 24.

Figure 11:
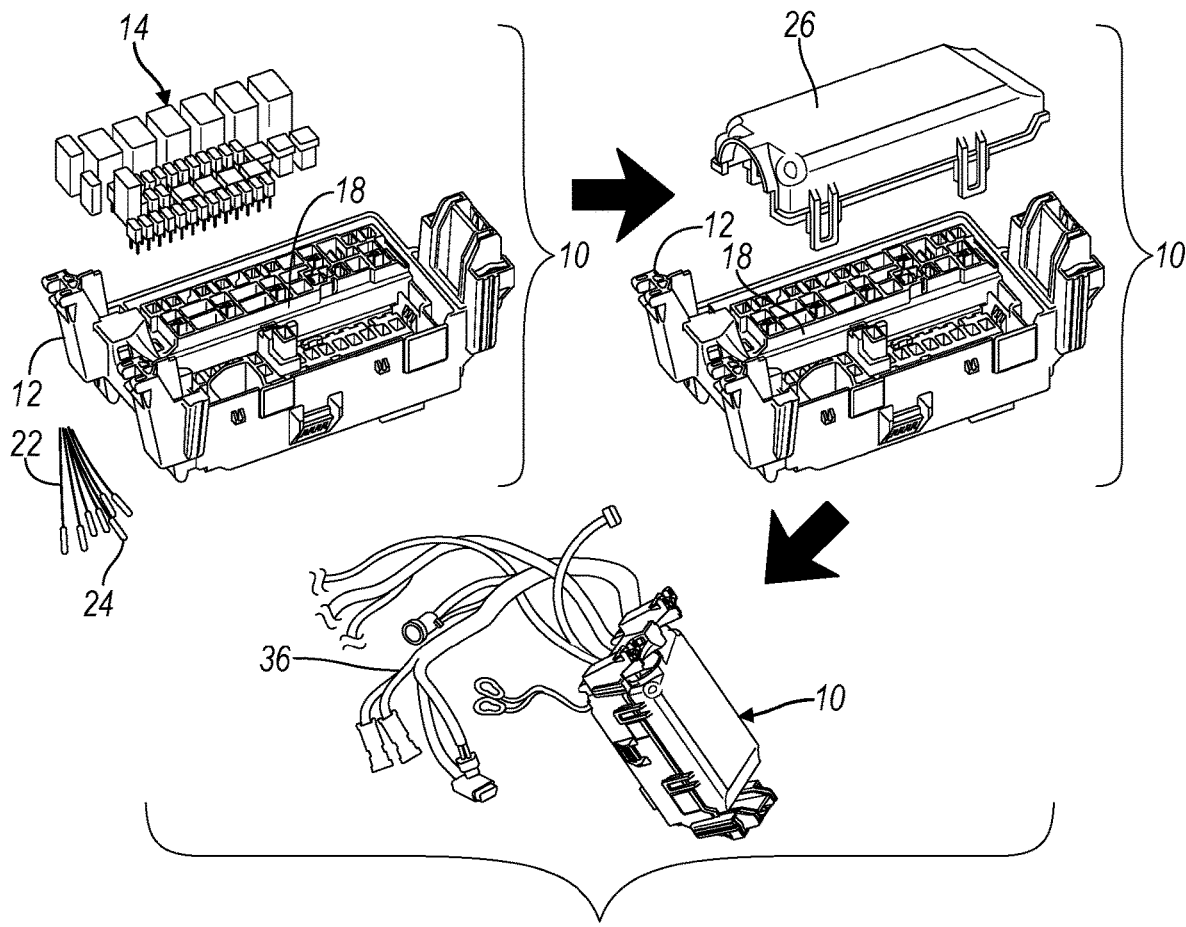
FIG. 11 is a schematic flow chart illustrating an assembly method of the electrical assembly of FIG. 1.

FIG. 11 schematically illustrates an assembly operation of the PDC 10. In the first depiction, the TPA 18 is installed in the frame 12. The terminals 24 are installed into the TPA 18. Next, the installer presses on the flanges 34 of the TPA 18 as illustrated in FIG. 4. The fuse/relay array 14 is installed in the frame 12 in connection with the TPA 18. Referring again to FIG. 11, the second step of the Figure illustrates that the bottom cover 26 is installed to the frame 12. Likewise, the top cover 16 is also installed to the frame 12. In the last step of FIG. 11, a wire harness 36 is connected to the PDC 10.

Referring again to FIG. 4, if the operator does not push the TPA 18 to the end position after all of the terminals 24 are installed, the terminals 24 may not be properly retained in the frame sockets 46, the fuse relay array 14 may not properly seat within the frame 12, or the fuse/relay array 14 may not provide consistent or accurate electrical contact with the terminals 24. Such misalignments may not be detected until after assembly of the PDC 10 with the wire harness 36. Or when the terminal 24 is not inserted at a proper position (referring again to FIG. 10), the TPA 18 can not be pushed to the end position; and a connection issue between the terminal 24 and the fuse/relay array 14 may also take place.

Figure 12:
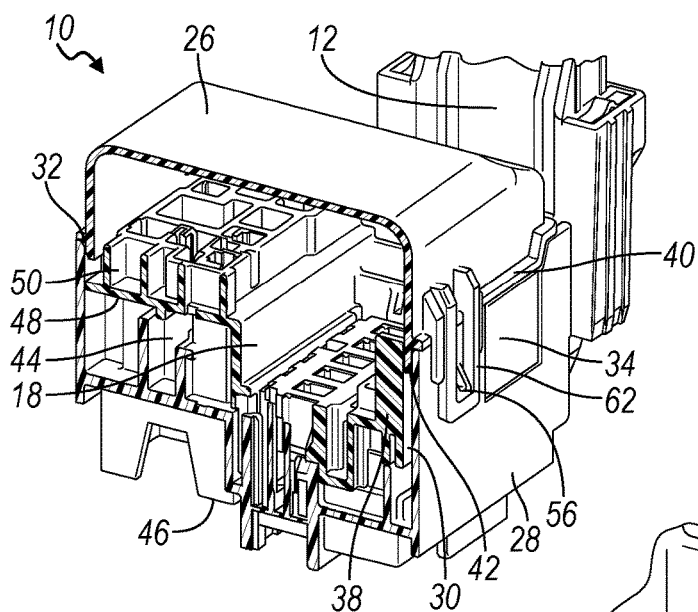
FIG. 12 is a perspective section view of the electrical assembly of FIG. 1.
Figure 13:
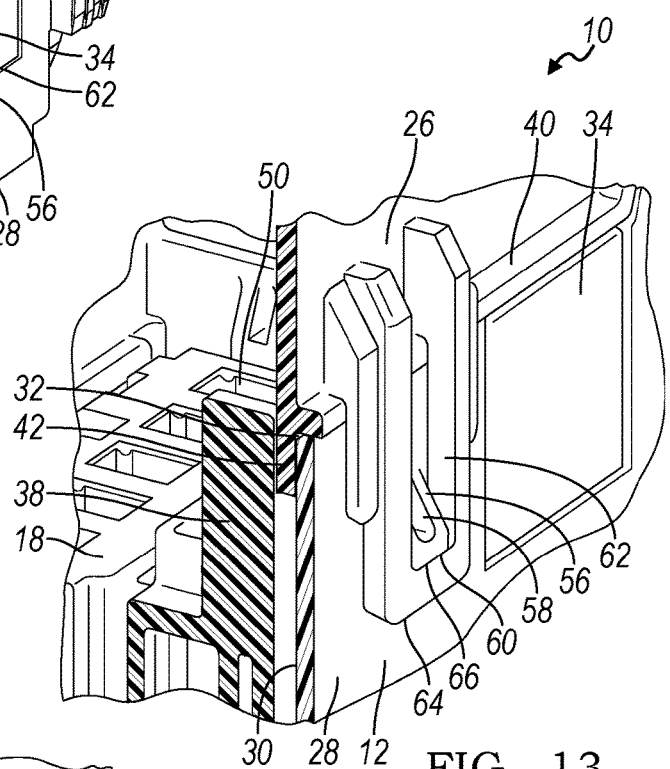
FIG. 13 is an enlarged perspective partial section view of the electrical assembly of FIG. 1, according to an embodiment, illustrated in a proper installation position.
Figure 14:
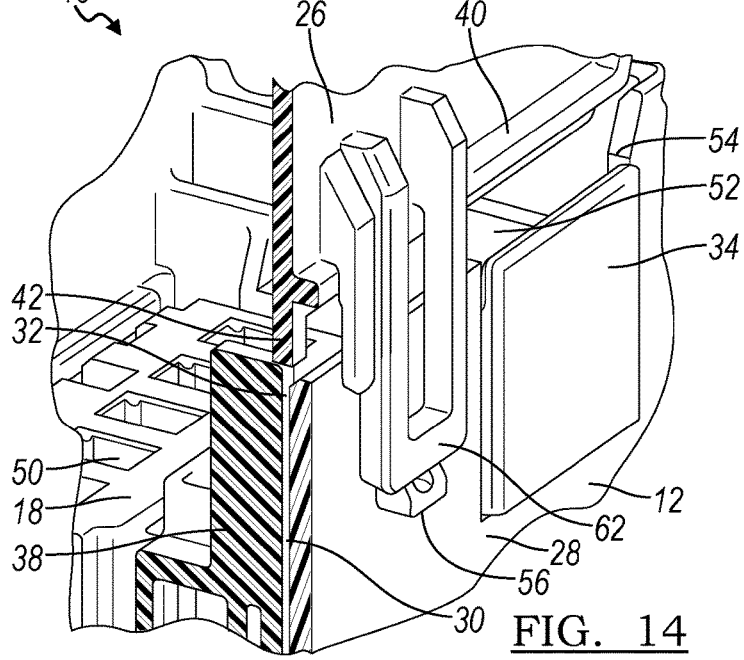
FIG. 14 is an enlarged perspective partial section view of the electrical assembly of FIG. 1, according to an embodiment, illustrated in an improper installation position.

In order to avoid such issues, the PDC 10 includes an alignment feature. Referring now to FIGS. 12-14, the TPA 18 includes an interference projection 38 that extends from the TPA 18. The interference projection 38 extends parallel with and along the sidewall 28 of the frame 12 and spaced apart from the frame 12 to provide a limited clearance for the bottom cover 26. As illustrated in FIG. 12, if the TPA 18, is in the pre-position, then the interference projection 38 extends along the sidewall 28 without a space between the interference projection 38 and the sidewall 28. In this pre-position of the TPA 18, the interference projection 38 interferes with the bottom cover 26, thereby preventing the bottom cover 26 from closing upon the frame 12. By preventing the installer from installing the bottom cover 26, the installer is thereby alerted that the TPA 18 is in an incorrect position.

The sidewalls 28 of the frame 12 provide a distal peripheral rim at the opening 32 of the cavity 30. Likewise, the bottom cover 26 includes a bottom distal rim 40 that is sized to engage the opening 32. The bottom cover 26 also includes an interference projection 42 extending downward from the rim 40 and aligned to be adjacent to the TPA interference projection 38. When the TPA 18 is installed in the end position, a gap is provided in between the TPA interference projection 38 and the sidewall 28. The cover interference projection 42 extends into the cavity 30 between the sidewall 28 and the TPA interference projection 38 as illustrated in FIGS. 12 and 13.

However, when the TPA 18 is installed in the improper, pre-position of FIG. 14, the TPA interference projection 38 is along the sidewall 28, thereby interfering with the cover interference projection 42, and consequently preventing installation of the bottom cover 26 upon the frame 12. As depicted, the TPA interference projection 38 extends out of the cavity 30, through the opening 32 to provide additional interference with the bottom cover 26.

Referring again to FIG. 12, the frame 12 includes a substrate 44 with a plurality of the frame sockets 46 facing upward, which consequently is downward in FIG. 12 due to the flipped orientation of the PDC 10. The sockets 46 are sized to receive the fuse/relay array 14. Likewise, on the other side, the terminals 24 are inserted into the frame socket 46 through the TPA sockets 50 in a substrate 48 of the TPA 18. Electrical contacts of the fuse/relay array 14 pass through the apertures 80 in the frame substrate 44 for electrical contact with the terminals 24. Proper position of the TPA 18 ensures proper connection of the fuse/relay array 14 and the terminals 24.

Referring now to FIG. 14, each of the flanges 34 are mounted upon an alignment projection 52 that extends from the TPA 18. A plurality of slots 54 are formed through the sidewall 28 to receive the alignment projections 52 and to permit the flanges 34 to extend external of the bottom cover 26 and the frame 12. The slots 54 are adjacent the opening 32 to permit installation and alignment of the TPA 18 into the cavity 30. The slots 54 also permit the operator to press the flange 34 toward the sidewall 28 of the frame 12.

Referring again to FIGS. 12-14, the frame 12 includes a plurality of first fasteners 56 formed along the sidewall 28. With reference to FIG. 13, each first fastener 56 has a leading edge 58 inclined away from the opening 32 of the frame 12, and an abutment edge 60 facing away from the opening 32. The bottom cover 26 includes a corresponding plurality of second fasteners 62 extending downward from the bottom cover 26 to engage the plurality of first fasteners 56 to fasten the bottom cover 26 to the frame 12. Each second fastener 62 includes a cantilevered end 64 to engage the leading edge of the first fastener 56, deform the cantilevered end, and consequently retract to the sidewall 28. The second fastener 62 also includes an internal abutment edge 66 to engage the abutment edge 60 of the first fastener 56 to fasten the bottom cover 26 to the frame 12.

As illustrated in FIG. 14, the interference of the TPA interference projection 38 with the cover interference projection 42 prevents the cover fasteners 62 to fasten to the frame fasteners 56, thereby informing the installer that the TPA 18 is improperly installed. In response, the installer may remove the bottom cover 26, and press upon the flanges 34 to move the TPA 18 to the end position. If the TPA 18 will not translate from the pre-position to the end position, then the installer checks the installation of the terminals 24. After all terminals 24 are properly installed into the frame sockets 46, the installer presses upon the flanges 34 to move the TPA 18 to the end position. After proper alignment, the installer may reinstall the bottom cover 26 until the bottom cover 26 is properly seated with the cover fasteners 62 fastened to the frame fasteners 56.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An electrical assembly comprising:
    a housing with an opening;
    an electrical terminal assembly received within the housing;
    a cover in cooperation with the housing to enclose the opening; and
    an interference projection extending from the electrical terminal assembly or the cover and in cooperation with the other of the electrical terminal assembly or the cover to prevent the cover from enclosing the opening of the housing when the electrical terminal assembly is improperly installed in the housing; and
    wherein the housing further comprises:
        a frame, and
        at least one sidewall extending from the frame, partially defining the housing opening, wherein the cover engages a distal peripheral edge of the at least one sidewall.

2. The electrical assembly of claim 1 wherein the electrical terminal assembly comprises:
    a terminal position assurance assembly (TPA) that is translatable relative to the housing between a first position to permit installation of terminals through the TPA and into the housing, and a second position to lock the terminals into the housing; and
    a plurality of electrical terminals installed through the TPA into the housing and locked into the housing by the TPA.

3. The electrical assembly of claim 2 wherein the TPA comprises:
    a substrate sized to be received in the housing, wherein the interference projection extends from the substrate; and
    a plurality of electrical terminals installed in the substrate.

4. The electrical assembly of claim 3 further comprising a busbar in electrical communication with at least two of the plurality of electrical terminals.

5. The electrical assembly of claim 4 further comprising a wire harness in electrical communication with the busbar.

6. The electrical assembly of claim 1 further comprising an alignment projection extending from the electrical terminal assembly; and
    wherein a slot is formed through the housing adjacent the opening and sized to receive the alignment projection of the electrical terminal assembly.

7. The electrical assembly of claim 6 further comprising a flange extending from the alignment projection outboard of the housing and the cover for manual alignment of the electrical terminal assembly relative to the housing.

8. The electrical assembly of claim 6 wherein the interference projection extends in a direction generally parallel with the at least one sidewall.

9. The electrical assembly of claim 6 wherein the interference projection extends from the cover between the at least one sidewall and the electrical terminal assembly when the electrical terminal assembly is properly installed in the housing.

10. The electrical assembly of claim 1 wherein the interference projection extends from the electrical terminal assembly and engages the cover to prevent the cover from engaging the distal peripheral edge of the at least one sidewall of the housing when the electrical terminal assembly is improperly installed in the housing.

11. The electrical assembly of claim 10 wherein the interference projection extends away from the frame.

12. The electrical assembly of claim 11 wherein the interference projection extends out of the housing opening.

13. The electrical assembly of claim 10 wherein the interference projection is further defined as a first interference projection; and
    wherein the electrical assembly further comprises a second interference projection extending from the cover to engage the first interference projection when the electrical terminal assembly is improperly installed in the housing.

14. The electrical assembly of claim 13 wherein the second interference projection extends between the at least one sidewall and the first interference projection when the electrical terminal assembly is properly installed in the housing.

15. The electrical assembly of claim 1 further comprising:
    a first fastener on the at least one sidewall; and
    a second fastener on the cover to cooperate with the first fastener and secure the cover to the housing.

16. The electrical assembly of claim 15 wherein the interference projection prevents the second fastener from fastening to the first fastener when the electrical terminal assembly is improperly installed in the housing.

17. The electrical assembly of claim 1 further comprising a fuse array installed into the housing in electrical communication with the electrical terminal assembly.

18. A method for assembling the electrical assembly of claim 2, the method comprising:
    installing the electrical terminal assembly in the housing;
    installing the TPA from a first position to a second position;
    if the TPA cannot slide to the second position, repositioning the electrical terminal assembly until the interference projection is clear; and
    reinstalling the TPA to the second position on the housing.

19. The electrical assembly of claim 2
    wherein interference between the cover and the TPA is caned by a failure of an installer to push the TPA from a first position to a second position during installation, or the TPA remains at the first position and cannot be pushed to the second position when the electrical terminal assembly is improperly installed in the housing, such that the electrical terminal assembly requires repositioning until the interference projection is cleared and the cover encloses the opening.

20. An electrical assembly comprising:
    a housing with an opening;
    an electrical terminal assembly received within the housing;
    a cover in cooperation with the housing to enclose the opening;
    an interference projection extending from the electrical terminal assembly or the cover and in cooperation with the other of the electrical terminal assembly or the cover to prevent the cover from enclosing the opening of the housing when the electrical terminal assembly is improperly installed in the housing; and
    an alignment projection extending from the electrical terminal assembly; and wherein the housing comprises at least one sidewall with a slot formed therethrough adjacent the opening and sized to receive the alignment projection of the electrical terminal assembly.

\* \* \* \* \*

UNITED STATES PATENT AND TRADEMARK OFFICE
CERTIFICATE OF CORRECTION

PATENT NO. : 11,025,016 B2
APPLICATION NO. : 16/722411
DATED : June 1, 2021
INVENTOR(S) : Yuanlong Zhong et al.

Page 1 of 1

It is certified that error appears in the above-identified patent and that said Letters Patent is hereby corrected as shown below:

In the Claims

Column 8, Line 45, Claim 19:
Before "by a failure"
Delete "caned" and
Insert -- caused --.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*

UNITED STATES PATENT AND TRADEMARK OFFICE
CERTIFICATE OF CORRECTION

| | |
|---|---|
| PATENT NO. | : 11,025,016 B2 |
| APPLICATION NO. | : 16/722411 |
| DATED | : June 1, 2021 |
| INVENTOR(S) | : Yuanlong Zhong et al. |

It is certified that error appears in the above-identified patent and that said Letters Patent is hereby corrected as shown below:

On the Title Page

Column 1, insert:
--(30) Foreign Application Priority Data
December 25, 2018 (CN) ........... 201811593188.X--

Signed and Sealed this
Sixth Day of September, 2022

Katherine Kelly Vidal
*Director of the United States Patent and Trademark Office*